Z. E. GILLEY.
CRANK.
APPLICATION FILED SEPT. 27, 1919.

1,351,639.

Patented Aug. 31, 1920.
2 SHEETS—SHEET 1.

Witnesses
L. R. Heinrichs

Inventor
Z. E. Gilley
By Victor J. Evans
Attorney

Z. E. GILLEY.
CRANK.
APPLICATION FILED SEPT. 27, 1919.
1,351,639.
Patented Aug. 31, 1920.
2 SHEETS—SHEET 2.
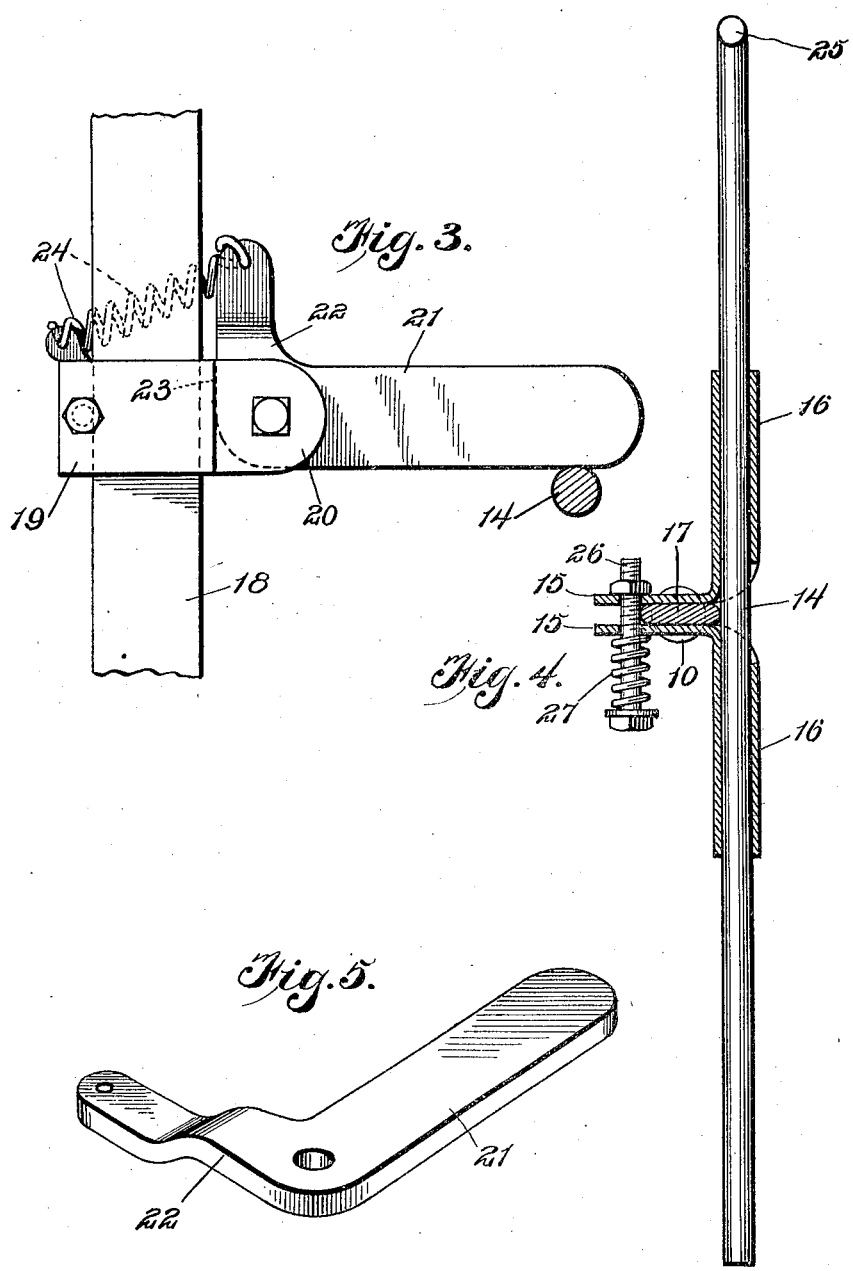

UNITED STATES PATENT OFFICE.

ZACHRIAH E. GILLEY, OF LAMASCO, TEXAS.

CRANK.

1,351,639.   Specification of Letters Patent.   Patented Aug. 31, 1920.

Application filed September 27, 1919. Serial No. 326,937.

*To all whom it may concern:*

Be it known that I, ZACHRIAH E. GILLEY, a citizen of the United States, residing at Lamasco, in the county of Fannin and State of Texas, have invented new and useful Improvements in Cranks, of which the following is a specification.

This invention relates to attachments for automobiles, and has for an object the provision of a device whereby an internal combustion motor may be cranked to start the same without danger of injury to the operator, due to back-firing by the engine.

Another object of the invention is the provision of an engine crank device, which will permit of the free rotation of the crank in one direction, but will permit only a partial rotation when moved in a reverse direction.

A further object is the provision of a device of this character, which is simple and durable of construction, positive in operation and which may be easily secured in position for use.

Other objects and advantages of the invention will appear as the following description is read in connection with the accompanying drawings.

In the drawings:

Fig. 3 is a horizontal sectional view taken just above the trip.

Fig. 4 is a section through the crank arm and transversely of the shaft which carries the said arm.

Fig. 5 is a detail perspective view of the trip.

Referring to the drawings in detail, like characters of reference denote corresponding parts throughout the several views.

Figure 1:
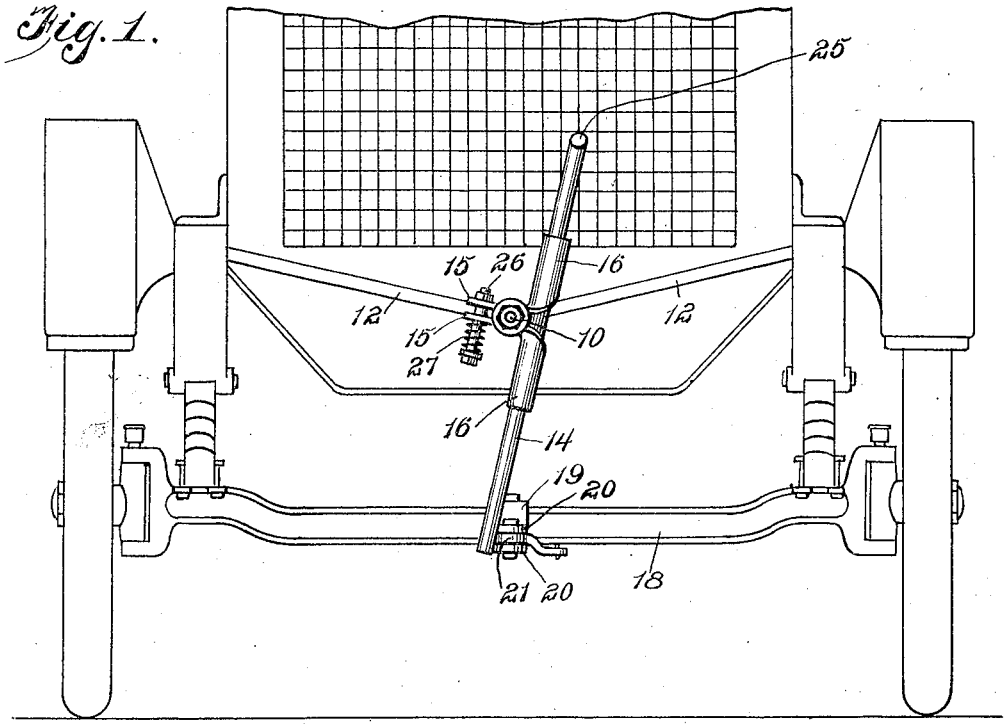
Figure 1 is a front elevation of a fragmentary portion of an automobile with the invention applied thereto.
Figure 2:
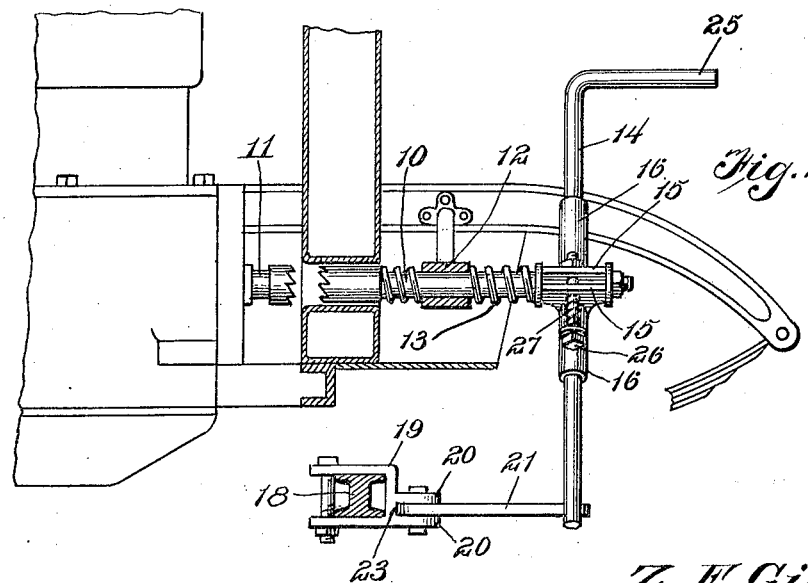
Fig. 2 is a fragmentary sectional view through a portion of an automobile showing the application of the engine, the latter being shown in elevation.

As illustrated in the accompanying drawings, the invention is shown as applied to a motor driven vehicle, although it is not the purpose of the present application to limit the use of the invention thereto, the said invention being equally well adapted for cranking internal combustion engines when used in other connections; for example, upon motor boats.

In carrying out the invention, there is provided a short shaft section 10, one end of which has an operative engagement with the end of the crank shaft 11 of the engine, after the manner of the ordinary engine crank arm. This shaft 10 projects through the frame 12 of the vehicle and is surrounded by a spring 13 for the purpose of providing a yielding engagement between the shaft 10 and the end of the engine crank shaft 11, as is usual in devices of this character.

Secured upon the outer end of the shaft 10 is a crank arm 14, the said arm being positioned transversely of the shaft 10 and extending upon opposite sides thereof. This arm 14 is clamped to the shaft 10 through the medium of laterally extending spaced ears 15, which are carried by sleeves 16, secured to the arm 14. The ears 15 engage upon opposite sides of the shaft 10, the latter being flattened at this point, as indicated at 17, so that rotary movement of the arm 14 with respect to the shaft is prevented.

Secured to the axle 18 of the vehicle beneath the shaft 10, is a bracket 19, the latter having spaced ears 20, which have pivotally secured between them a dog 21. This dog is substantially L-shaped, being provided with extensions 22, which engage a shoulder 23 of the bracket 19, for the purpose of limiting the pivotal movement of the dog in one direction. The extension 22 is normally held in engagement with the shoulder 23 through the medium of a coiled spring 24 secured to the said dog and to the bracket 19. One end of the crank arm 14 is provided with an operating handle 25.

In the use of the invention, the handle 25 is grasped in the ordinary manner and the arm rotated, which rotates the shaft 10 to start the motor. In the event of the engine "kicking," or "back-firing," which results in a movement of the crank arm in an opposite direction, the said arm will contact with the dog 21, to arrest the movement of the arm.

In order to prevent breakage of the parts, due to the sudden contact of the arm 14 of the dog 21, the spaced ears 15 are yieldingly held clamped upon opposite sides of the flattened portion 17 of the shaft 10 through the medium of a bolt 26, which is surrounded by a coiled spring 27. Thus, when the crank arm 14 strikes against the dog 21, the ears 15 will be separated against the action of the spring 17 to permit of the rotation of the crank arm 14 about the shaft 10. This rotation is, however, very gradual, being resisted by the spring 27, so danger of injury to the person cranking the machine is reduced to a minimum.

The invention is susceptible of various changes in its form, proportions and minor details of construction and the right is herein reserved to make such changes as properly fall within the scope of the appended claims.

Having described the invention, what is claimed is:

1. The combination with a vehicle having an internal combustion motor, of a shaft having an operative connection with the crank shaft of the motor, a crank arm carried by and disposed transversely of and extending upon opposite sides of the first mentioned shaft and a trip secured to the vehicle below the shaft and in the path of movement of both ends of the crank arm.

2. The combination with a vehicle having an internal combustion motor, of a shaft having an operative connection with the crank shaft of the motor, a crank arm carried by and disposed transversely of and extending upon opposite sides of the first mentioned shaft, a bracket secured to the axle of the vehicle below the shaft, a spring actuated dog pivotally secured to the bracket in the path of movement of both ends of said arm, a stop for limiting the movement of the dog in one direction and a clamp located intermediate the ends of the arm for yielding engagement with the first mentioned shaft.

In testimony whereof I affix my signature.

ZACHRIAH E. GILLEY.